US006527691B1

(12) United States Patent
Moore

(10) Patent No.: US 6,527,691 B1
(45) Date of Patent: Mar. 4, 2003

(54) IN SITU FORMATION OF MAGNETITE REACTIVE BARRIERS IN SOIL FOR WASTE STABILIZATION

(75) Inventor: Robert C. Moore, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/542,437

(22) Filed: Apr. 4, 2000

(51) Int. Cl.[7] ................................................ A62D 3/00
(52) U.S. Cl. ....................................................... 588/253
(58) Field of Search ............................ 588/15, 20, 236, 588/237, 256; 405/263

(56) References Cited

U.S. PATENT DOCUMENTS

| | | | |
|---|---|---|---|
| 4,321,158 A | * 3/1982 | Beall et al. | 252/628 |
| 5,322,644 A | * 6/1994 | Dunn et al. | 252/626 |
| 5,595,666 A | 1/1997 | Kochen et al. | 210/679 |
| 6,084,146 A | * 7/2000 | Barkatt et al. | 588/10 |

OTHER PUBLICATIONS

James Farrell, William D. Bostick, Robert J. Jarabek, and Joseph N. Fiedor, *Electrosorption and Reduction of Pertechnetate by Anodically Polarized Magnetite*, Environ. Sci. Technol., 33 (8), 1244–1249, 1999.

B. Grambow, E. Smailos, H. Geckeis, R. Müller, and H. Hentschel, *Sorption and Reduction of Uranium (VI) on Iron Corrosion Products under Reducing Saline Conditions*, Radiochimica Acta 74, 149–154, 1996.

Joseph N. Fiedor, William D. Bostick, Robert J. Jarabek, and James Farrell, *Understanding the Mechanism of Uranium Removal from Groundwater by Zero–Valent Iron Using X–ray Photoelectron Spectroscopy*, Eviron. Sci Technol., 32 (10), 1466–1473, 1998.

Thomas E. Boyd and Robert L. Kochen, *Ferrite Treatment of Actinide Waste Solutions: Multi–Stage Continuous Processing*, RFP–3582.

R. I. Haines, D. G. Owen, and T. T. Vandergraaf, *Technetium–Iron Oxide Reactions Under Anaerobic Conditions: A Fourier Transform Infrared, FTIR Study*, Nuclear Journal of Canada 1987/1:1/pp. 32–37.

Daquing Cui and Trygve E. Eriksen, *Reduction of Pertechnetate by Ferrous Iron in Solution: Influence of Sorbed and Precipitated Fe(II)*, Environmental Science & Technology, vol. 30, No. 7, pp. 2259–2262.

J. P. Jolivet, P. Belleville, E. Tronc, and J. Livage, *Influence of Fe(II) on the Formation of the Spinel Iron Oxide in Alkaline Medium*, The City Minerals Society (Clays and Clay Minerals) vol. 40, No. 5, 531–539, 1991.

Thomas E. Boyd, Marlene Y. Price, Robert L. Kochen, *Ferrite Treatment of Actinide Waste Solutions: Chemical Interferences in Actinide Removal by Ferrite Treatment*, RFP–3601, DOE/TIC–4500 (Rev.73), 1985.

Daqing Cui and Trygve E. Eriksen, *Reduction of Pertechnetate in Solution by Heterogeneous Electron Transfer from Fe(II)–Containing Geological Material*, Enriron. Sci. Technol, 30(7), 2263–2269, 1996.

* cited by examiner

*Primary Examiner*—Stanley S. Silverman
*Assistant Examiner*—Edward M. Johnson
(74) *Attorney, Agent, or Firm*—Russell D. Elliott

(57) ABSTRACT

Reactive barriers containing magnetite and methods for making magnetite reactive barriers in situ in soil for sequestering soil contaminants including actinides and heavy metals, organic materials, iodine and technetium are disclosed. According to one embodiment, a two-step reagent introduction into soil takes place. In the first step, free oxygen is removed from the soil by separately injecting into the soil aqueous solutions of iron (II) salt, for example $FeCl_2$, and base, for example NaOH or $NH_3$ in about a 1:1 volume ratio. Then, in the second step, similar reagents are injected a second time (however, according to about a 1:2 volume ratio, iron to salt) to form magnetite. The magnetite formation is facilitated, in part, due to slow intrusion of oxygen into the soil from the surface. The invention techniques are suited to injection of reagents into soil in proximity to a contamination plume or source allowing in situ formation of the reactive barrier at the location of waste or hazardous material. Mixing of reagents to form. precipitate is mediated and enhanced through movement of reagents in soil as a result of phenomena including capillary action, movement of groundwater, soil washing and reagent injection pressure.

19 Claims, 3 Drawing Sheets

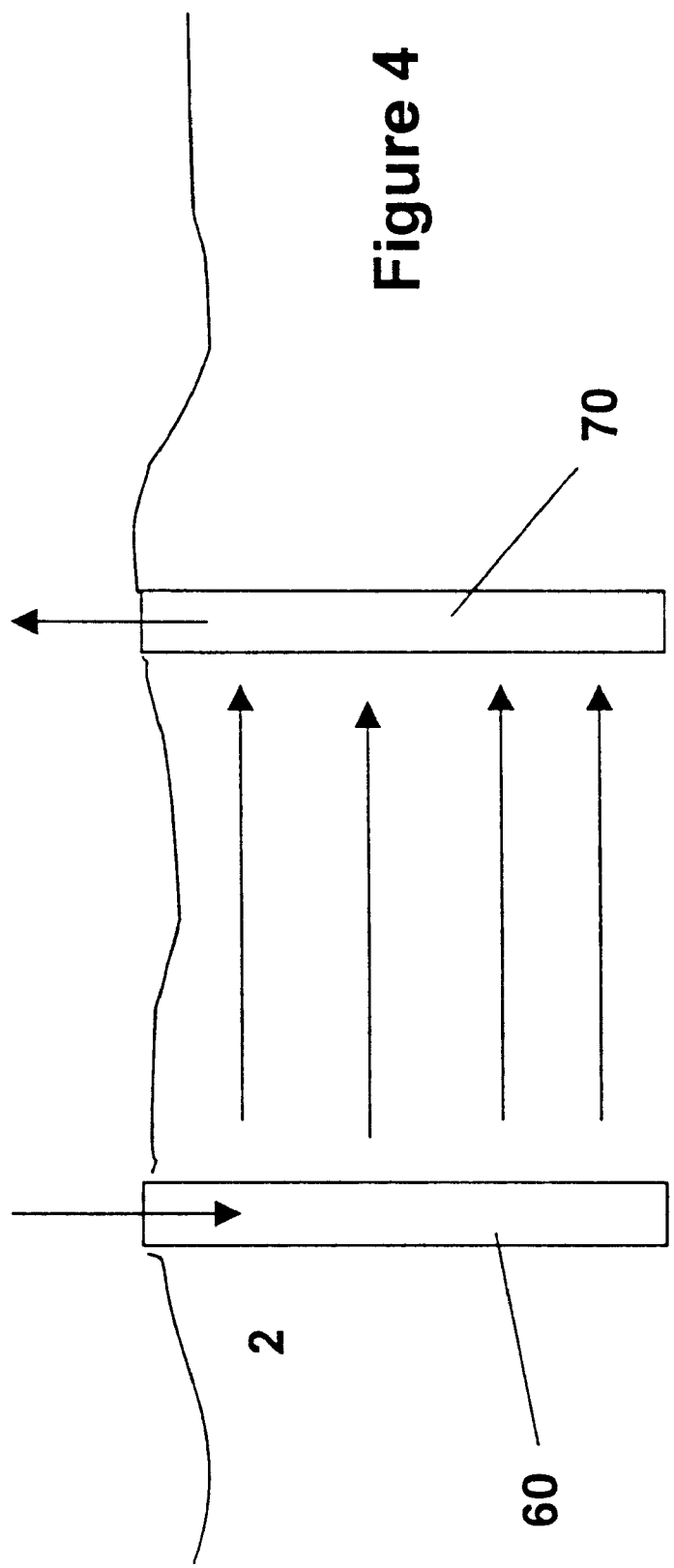

1

IN SITU FORMATION OF MAGNETITE REACTIVE BARRIERS IN SOIL FOR WASTE STABILIZATION

This invention was made with support from the United States Government under Contract DE-AC04-96AL85000 awarded by the U.S. Department of Energy. The Government has certain rights in this invention.

BACKGROUND OF THE INVENTION

1. Field of the Invention

This invention pertains generally to in situ formation of reactive barriers in soil, and more specifically the invention relates to in situ formation of magnetite ($Fe_3O_4$) reactive barriers created by mixing solutions injected into soil. The solutions react, fill void spaces and coat particles in soil with reactive magnetite thereby resulting in a very large reactive surface area that allows water to pass, but sequesters or destroys radionuclides, heavy metals or organics.

2. Description of the Related Art

Magnetite and goethite have been demonstrated to provide an effective barrier for preventing the transport of certain radioactive minerals including plutonium and heavy metals. Techniques (Boyd, et al., 1985) have been developed to produce goethite and magnetite from water soluble compounds, and involve, for example, reacting a soluble Fe(II) salt solution with a base to form Fe(III)/Fe(II) solid. The resulting magnetite is extremely stable both kinetically and thermodynamically. Moreover, for purposes of hazardous material remediation, magnetite is one of the only minerals that has been demonstrated to form an effective reactive barrier for transport of the heavy metal technetium, Tc. It also is effective in creating a barrier to the passage of actinides, iodine, heavy metals and some organic substances.

Leakage of radioactive materials, heavy metals, and other contaminants from storage tanks and subsequent migration of those substances away from the containment area continues to be a significant unresolved problem at a number of government and private storage sites. Various techniques are used to try to isolate leaking storage containers and contaminated soil to prevent movement of contaminants into uncontaminated soil and especially groundwater. Tc leakage from tanks at the Hanford site in Washington state, for example, is especially of major concern, in part because of the tendency of Tc to form highly water-soluble compounds in its higher oxidation states. Those water-soluble compounds can exhibit very high mobility in soil.

One approach to remediating soil contamination is simply to attempt to dig up and remove soil containing hazardous material. This, however, is costly, and disturbance of contaminated soil carries the risk that some contaminants will be missed or released and left to migrate further. Excavation also has a negative effect on soil stability. Excessive digging and excavation around waste tanks, for example, has the potential to aggravate waste transport by shaking loose corroded containment drums and already contaminated soil.

Another approach is to establish barriers in the soil of a contaminated site in order to prevent migration of contaminants beyond the barriers. Barriers of this sort that are in use at various sites around the United States and abroad include vertical sleeves placed in trenches surrounding a site. They also include walls formed through the injection of highly pressurized grout in holes drilled in the soil. Emplacement of such barriers typically requires greatly disturbing the soil and often there is no convenient way to create a "floor" or continuous barrier beneath the leaking tank or contaminated region. Consequently, the sequestration of the contaminants is incomplete and contaminants can continue to migrate downward and perhaps outward, thereafter. For areas under waste tanks, waste trenches and certain geological formations, forming a continuous barrier is difficult and sometimes impossible.

Various efforts have been made to create reactive barriers which, in addition to forming a physical obstruction to the movement of contaminant substances, actively attract and chemically bind contaminants. Even more advantageous, however, would be formation of a permeable "barrier" though which water can freely pass, but which immobilizes and sequesters pollutants. The need remains, therefore, for reactive barriers capable of being formed in situ in soil that are thermodynamically and kinetically stable, that serve to sequester radioactive materials, iodine, organic pollutants, and heavy metals including Tc while allowing water to pass though.

SUMMARY OF THE INVENTION

Therefore, it as an object of the present invention to provide reactive barriers capable of binding and inhibiting migration of soil contaminants including radioactive materials, organics, iodine and heavy metals including Tc.

It is another object of the invention to provide a method of in situ formation of reactive barriers in soil wherein those barriers include magnetite.

It is another object of the invention to provide barriers, formed in situ, wherein magnetite is dispersed throughout a. large volume of soil.

It is yet another object of the invention to utilize capillary action of soil, and/or movement of groundwater, and/or soil washing to help mix water-soluble reagents injected at low pressure to react and chemically form a reactive barrier in the soil, itself.

An advantage of the present invention is that by adequately saturating soil with necessary chemical reagents, the barrier formed using the methods described here can extend throughout a large volume of soil, for example, surrounding and including soil containing pollutants.

Another advantage of the present invention is that it accommodates use of lowpressure injection techniques, should minimal disturbance of the soil be needed or desired in forming the reactive barrier.

Another advantage of the invention is that the chemical processes involved are suited also to high-pressure injection of reagents, for circumstances wherein rapid injection is desired or required.

Another advantage of the present invention is that it is economical in comparison with traditional digging and excavation decontamination methods, and no backfilling is required.

These and other objects and advantages of the present invention are fulfilled and. satisfied by the claimed invention which involves introducing into soil an aqueous solution of iron salt and, separately, an aqueous basic solution, such as NaOH, KOH or $NH_3$. Then, by way of in situ mixing, magnetite is formed in the soil thereby creating a reactive barrier that sorbs contaminants including actinides, heavy metals, iodine, technetium and organic materials. According to an embodiment of the invention, a two-step introduction of the above-mentioned solutions can be used. In the first step, according to one embodiment, roughly equivalent amounts and concentrations of iron salt solution and base solution are introduced into soil and allowed to mix, thereby forming Fe(III) oxide, iron oxyhydroxides and other similar compounds. According to the invention, these compounds serve to remove oxygen from the soil matrix. In the second step, iron salt solution and base solution are introduced into the same soil (for example, using similar concentrations), but this time using more base solution than iron salt solution (optimally, in a volume ratio of about 2:1, base to salt, using solutions of similar concentration). As these reagents react, magnetite is formed in situ in the soil. Various embodiments showing alternative approaches to introducing reagents into the soil are disclosed in this specification.

Additional advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and forms part of the specification, illustrates an embodiment of the invention and, together with the description, serves to explain the principles of the invention.

FIG. 4 is a schematic illustration showing an alternative to the embodiments shown in the other illustrations, but wherein a soil washing technique is used to form a barrier in situ in soil.

DETAILED DESCRIPTION OF THE INVENTION

Figure 1A:
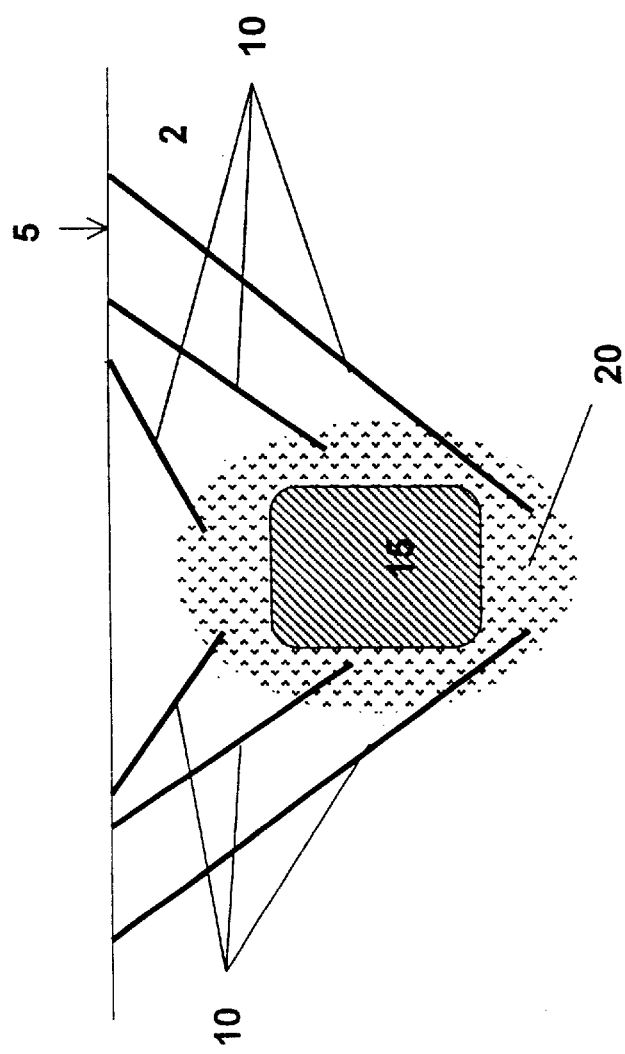
FIG. 1 (including FIG. 1a and FIG. 1b) contains schematic illustrations showing top and side views of how chemical solutions are injected into soil around a containment vessel to form a reactive barrier capable of completely surrounding waste.

As indicated above, the present invention provides an alternative to current contaminant sequestration or soil removal methods. According to the invention, a truly in situ procedure utilizes, for example, the capillary action of the soil to disseminate and help mix injected water-soluble reagents, which will react and chemically form the reactive barrier in the soil itself. Also according to the invention, mixing can be enabled or enhanced as a result of movement of groundwater in soil, application of soil washing (as described below), or as a result of injection pressure being applied when the reagents are introduced into the soil. In this method, two solutions (one containing an iron salt such as $FeCl_2$ and one containing a base such as $NaOH$) are pumped into soil around a contaminated site and either actively or passively dispersed through the soil. The solutions combine and react with oxygen to form magnetite precipitates that bind actinides, heavy metals and iodine, and serve to reduce some organic materials. Notably, magnetite precipitates formed in this way also capable of binding. technetium, which is a major concern, for example, due to leakage from waste storage tanks.

According to one embodiment, the present invention uses a two step process that involves first preparing soil (where needed) for the formation of magnetite therein, and then actually adding the reactants to form magnetite. For both the first step (soil preparation and oxygen removal) and the second step (magnetite formation), chemicals in aqueous solution are introduced into the soil and allowed to percolate through the soil and mix therein. In situ reaction in this fashion creates a precipitated reactive barrier wherein a magnetite precipitate partially or completely coats particles in the soil and fills some of the void space in the soil. The chemical processes of the invention are suited to adaptation to various injection techniques, described further in detail below.

According to one embodiment of the present invention, solutions of $FeCl_2$ and $NaOH$ are prepared. Concentrations can range from very dilute to concentrated. If slower reactions are desired, then less concentrated solutions are indicated. Appropriate reaction speeds may depend in part on the porosity of the soil and conditions. If. reactants tend to percolate (as discussed below) through soil rapidly, for example, higher concentrations can be tolerated with favorable results. Where significant amounts of oxygen are present in the soil, it is appropriate to remove oxygen during an initial step. This is because favorable conditions for formation of magnetite include those in which slow oxygen intrusion is attained (such as when oxygen slowly diffuses from the soil surface). (See Jolivet et al., 1992.) In the instance in which oxygen removal is needed or desired, a first injection takes place wherein the two solutions are injected into the ground in approximately equal proportions. As they mix, they react with oxygen present in the soil and precipitate, for example, iron hydroxides. In this way, free oxygen is removed from the soil in preparation for the next step in which magnetite is formed.

Next, according to this embodiment, $FeCl_2$ and $NaOH$ solutions, similar to those prepared above, are injected a second time into the soil, however, this time they are injected according to approximately a 1:2 volume ratio. (Alternatively, similar volumes could be used, but with a higher concentration of base. Ratios other than the 1:2 ratio mentioned here are effective so long as the combined solutions remain basic after mixing.) As oxygen slowly diffuses from the surface (or is deliberately added slowly) magnetite forms and precipitates from solution.

Laboratory studies by the inventor demonstrated formation of magnetite in soil where aqueous solutions of $Fe(II)Cl_2$ and $NaOH$ were mixed in situ in a soil column. using the technique just described. During the first step of the process, red Fe(III) oxide and oxyhydroxides were formed through reaction of the reagents in the presence of $O_2$ in the soil column. Then, when additional injections of $Fe(II)Cl_2$ and $NaOH$ solutions were done, a dispersed black magnetic solid was formed, which was identified through X-ray diffraction analysis to be 70–80% magnetite.

Similarly, reactive magnetite barriers can be formed using other iron salts such as those containing Fe(II) and Group VIIA elements other than chlorine. Other base solutions can be used, as well, including, for example, $NH_3$ or hydroxides of Group 1A elements other than sodium. Although the reagent proportions described above are suited to the oxygen removal and magnetite formation objectives noted, other proportions are contemplated by the invention, so long as the desired reaction products are generated. Reagent concentrations in the range of about 0.1M to about 1M will satisfactorily accomplish the ends of the invention. Higher concentrations may also prove workable, although the reactions proceed very rapidly at higher concentrations. As noted, slower reaction rates may be desired if more time is needed for the reagents to percolate through soil. Also, as indicated above, magnetite formation can be accomplished successfully using higher concentrations of base relative to iron salt instead of simply using greater volumes of base at a concentration similar to that of the salt.

Following are example embodiments illustrating various approaches to introducing reagents into soil according to the principles of the invention. For each figure, the injection method depicted and described is suited both to the first step (treating the soil to remove oxygen) and the second step (introducing reagents to actually form the magnetite precipitate) where the two-step process is used.

FIG. 1 Illustrates an embodiment of the present invention wherein a leaking waste tank, for example, is surrounded with magnetite precipitate using principles of the invention. Referring to FIG. 1, a waste tank 15 is shown in side view, buried in soil 2 beneath the soil surface 5. The bold lines in the figure represent boreholes 10 through which chemical solutions are injected from the surface 5. These boreholes 10 need not have a large diameter; rather they need be only of sufficient cross sectional size to permit injection of aqueous solutions into a region in proximity to the waste tank 15, as shown in the figure. Injection may be accomplished by pumping the solutions directly through the boreholes 10, or alternatively, by pumping reactant solutions through injection pipes positioned in the boreholes 10. In any case, the boreholes 10 provide for penetration of the soil from the soil surface 5 to the region proximity to the waste tank 15, as shown. As noted, an advantage of the present invention is-that it permits formation of a reactive barrier to sequester contaminants without significant detriment to soil stability. Injection using boreholes 10 as described is consistent with achieving that advantage.

The diameter and other physical characteristics of the boreholes 10 and the method for creating them in the soil will depend on various factors such as degree of soil compaction, physical constituents in the soil, and so forth. Borehole formation could be. accomplished as simply as by driving an injection pipe into the ground, if soil conditions will accommodate this. In other instances, it may be necessary to dig or drill to create the necessary boreholes. As noted, an advantage of the present invention is that it permits formation of a reactive barrier to sequester contaminants without significant detriment to soil stability. Injection using boreholes 10 as described is consistent with achieving that advantage.

According to this embodiment, reactants are injected through the boreholes 10 so that, in the first step when the $Fe(II)Cl_2$ and $NaOH$ are added, iron oxyhydroxides form to remove oxygen substantially from the region in proximity to and surrounding the waste tank. Then, the same or different boreholes can be used for the second injection so that when the magnetite precipitate forms take place, the chemical reaction products may substantially surround the tank 15. As noted, when the reactants in aqueous solution enter the soil, they tend to migrate as a result of capillary action through the soil. This capillary action is also responsible for causing the reactants to mix and react in situ thereby causing the formation of the magnetite likewise to form in situ. Also, as noted, other factors including injection pressure and groundwater movement contribute to in situ mixing and reaction of the aqueous solutions.

Figure 1B:
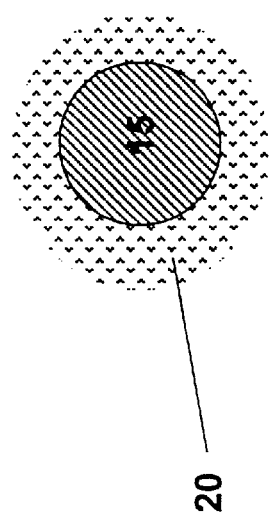

Both in FIG. 1a (cross sectional side view) and FIG. 1b (cross sectional top view), a water permeable precipitate barrier 20 capable of isolating contaminants is shown which generally surrounds the waste tank 15. It is contemplated that a plurality of boreholes 10 will be used, however, the necessary number and orientation of the boreholes 10 will depend on specific circumstances and conditions present concerning, for example, the waste to be encapsulated and the given soil conditions. Precise placement of boreholes is not needed so long as qualitatively the precipitate barrier 20 formed substantially permeates the soil containing the material sought to be sequestered.

In the illustrations just described, a leaking waste tank is shown, however, the principles of the invention are equally applicable where a plume of actinides or heavy metals, organics, iodine and/or Tc, for example, is present in the soil. Due to the reactive nature of the magnetite barrier formed, movement of contaminants can be arrested, and effective sequestration can be accomplished in a wide range of instances where the barrier is formed in situ around and even in the midst of contaminant species.

Figure 2:
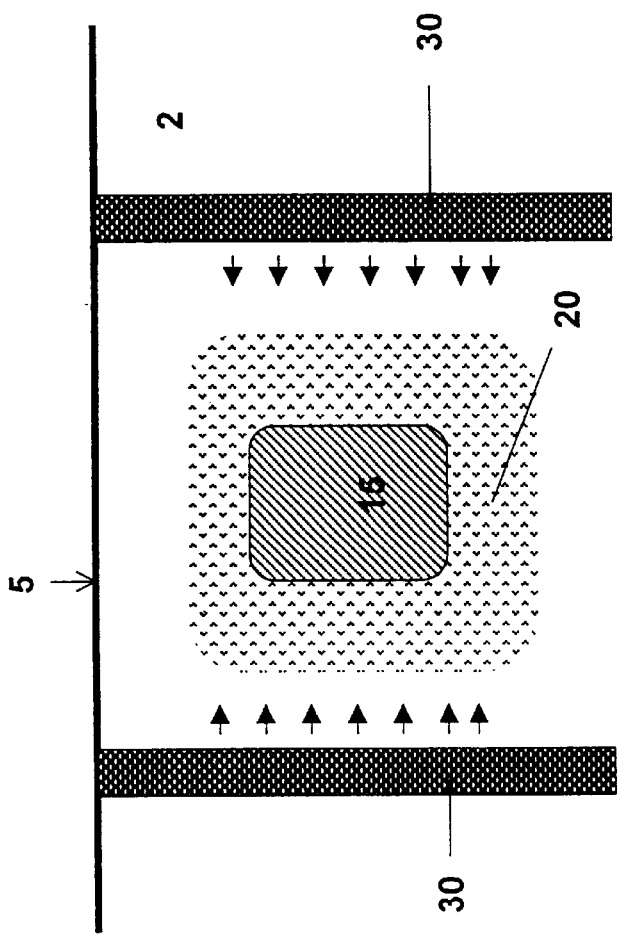
FIG. 2 is a schematic illustration of an alternate approach to dispersing the chemical reactants used in the present invention.

FIG. 2 shows another embodiment of the present invention. In this instance, pipes 30 having holes though which reactant solutions can pass are either buried or driven into the ground in proximity to a contaminant source such as a waste tank 15. The chemical reactions and two-phase injections performed in this embodiment are identical to those previously discussed. In this embodiment, the delivery of the reactants, however, is slightly different. Again, though, capillary action of the soil, groundwater movement, and injection pressure, either separately or in combination, cause reactants to percolate through the soil. In the example illustrated in the figure, the direction of percolation of reactants can be controlled to some degree. The arrows shown in the figure illustrate a predominant direction of flow resulting, for example, from openings being selectively oriented in the pipes 30 to favor injection toward the waste tank 15. This results in formation in situ of a barrier 20.

Figure 3:
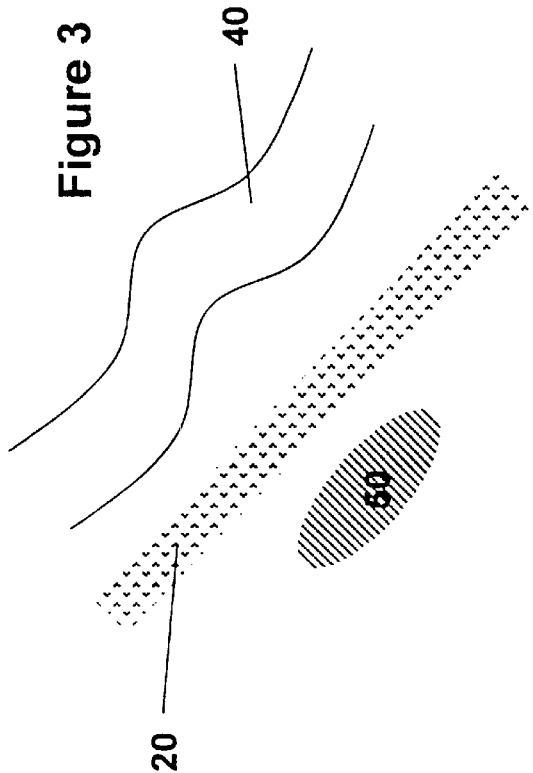
FIG. 3 is a schematic illustration of application of the inventive principles for the purpose of creating a generally horizontal relative barrier on one side of a waste source.

FIG. 3 illustrates an embodiment wherein the chemical reaction and injection principles described in the disclosure can be used to form a wall or other longitudinal barrier, for example, to obstruct migration of contaminants. In the illustration, contaminants from a plume 50 (such as in a waste trench), for example, or other contaminant source, toward water such as a stream or river 40. In the illustrated example, a barrier 20 is interposed between the plume 50 and a river 40 according to the same principles described elsewhere in the present application. This embodiment illustrates that, although the method of the present invention is especially suited to sequestration of contaminant sources. by effectively surrounding a contaminant source in a volume of soil, in situ formation of magnetite barriers according to the principles of the invention can be of benefit even where other barrier configurations, like walls, are used. Depending on the injection techniques used and the barrier required or desired, walls or this sort may be created at various depths. The invention method is well suited to forming reactive barriers at depths in excess of 30 feet, for example, where digging traditional trenches (and then filling them with a barrier material) to isolate waste is not a favored approach or perhaps even feasible. Problems with trenches of such depth result because they may need to be very wide depending on soil conditions in order to satisfy engineering and safety considerations. Costs and safety risks, including those associated with radiation hazard, are likely to be significant when such large trenches are dug. The barrier formation method of the present invention is not subject to geometric limitations of the sort associated with trenches.

FIG. 4 illustrates an embodiment of the present invention wherein construction of the reactive magnetite barrier is accomplished using a modification of an in situ soil washing technique. In situ soil washing involves introducing a washing reagent into the soil through a borehole or pipe placed vertically into the soil. The reagent travels through the contaminated soil reacting with or dissolving the contaminant and is recovered at another bore hole or steel pipe placed some distance away. Pumping or placing a vacuum at the recovery site is used to remove the reagent and contaminant. (Gabr, et al., 1996.)

Referring to FIG. 4, which is a schematic of the modified process for, first, removing oxygen according to step one of the two-step inventive process, and second, constructing a magnetite barrier. An injection well 60 and one or more recovery wells 70 are placed in the soil so that between them is a region of soil wherein barrier construction is to be accomplished. (Note that the Figure illustrates only a single injection well and a single recovery well. As will be described, the principles of this method can be extended to form a progressively larger wall.) According to one approach using this soil washing technique, one of the reagents (for example, dilute Fe(II) salt solution) is injected into the injection well 60 while suction is applied via the recovery well 70. In this way, the iron solution is drawn through the soil 2 in the direction shown by the horizontal arrows in the Figure, and then a part of that solution is slowly removed through the recovery well 70. Once the ground between the injection and recovery wells 60, 70 is at least partially saturated with solution, the other reagent (for example, dilute NaOH solution) is pumped in a similar fashion through the system. Using this technique, the reagents mix in the ground along the path between the injection well 60 and the recovery well 70. In step one of the invention process, the reagents are introduced in approximately a 1:1 ratio, to remove oxygen from the soil, as described. Then in step two, iron salt and base are mixed using approximately a 1:2 ratio, so that as oxygen slowly diffuses through the soil or is added slowly, magnetite precipitates and is formed in situ in the soil region between the two wells. As indicated, as well, above, it may be desirable to have multiple recovery wells for each injection well, depending on the area of soil sought to be saturated with solution. Additionally, a series of injection and recovery wells can be used to construct a continuous reactive barrier. For instance, wells can be arranged in a line generally describing the boundary of a desired barrier. Then, after one injection/recovery cycle has been completed with both reagents (with barrier having been formed therebetween), another cycle can take place, with, for example, the previous recovery well serving as a new injection well, and the next adjacent well serving as a new recovery well. Using a soil washing technique, in situ barrier formation can result in a somewhat precisely defined barrier than would generally be created relying only on capillary mixing, groundwater movement and simple injection pressure (discussed previously in this disclosure).

Finally, it is noted that although the previously described embodiments focus on actively injecting reagents into the soil (albeit, even at low pressure), the necessary mixing in situ can occur likewise in instances where reagents are simply poured on the surface of soil. This is because many of the physical principles causing percolation of reagents through soil apply regardless of whether the reagents are actively or passively introduced into the soil. Therefore, it is anticipated that certain applications wherein the principles of the invention would be advantageous or desirable will include relying on the option of simply pouring reagents in locations where migration of the reagents in the soil will result in the requisite mixing in situ in the soil. Therefore, unless otherwise specified or necessitated by context, the terms inject, injecting and injection are intended to encompass passive methods of introducing reagents into soil including simply pouring them on the soil surface.

The invention being thus described, it will be obvious that the same may be varied in many ways. Such Variations are not to be regarded as a departure from the spirit and scope of the invention, and all such modifications as would be obvious to one skilled in the art are intended to be included within the scope of the appended claims.

I claim:

1. A method for sequestering contaminants in soil comprising the steps of
    introducing into soil containing contaminants, at a first locus, a first solution containing an iron salt,
    introducing into said soil containing contaminants, at a second locus, a second solution containing at least one base compound,
    whereby the first solution and second solution come into contact with each other in said soil and react to form a magnetite precipitate in situ within said soil.

2. The method of claim 1 wherein orientation of the first and second loci is selected from the group consisting of the first and second loci being the same, and the first and second loci being different.

3. The method of claim 1 wherein the first solution and the second solution mix in the soil as a result of a mechanism selected from the group consisting of: capillary action within the soil causing movement of the first and second solutions resulting in their mixing, groundwater movement in the soil causing movement of the first and second solutions resulting in their mixing, injection pressure applied when introducing the first and second solutions in to the soil resulting in mixing of the first and second solutions, and any combination of the foregoing.

4. A method for sequestering contaminants in soil comprising the steps of:
    performing a first stage reagent introduction; comprising injecting a first solution into soil and injecting a second solution into said soil. whereby the first and second solutions combine and, if oxygen is present in said soil, react using said oxygen, and
    performing a second stage reagent introduction comprising injecting more of the first solution and second solution into said soil whereby the first and second solutions combine and react in the soil to form magnetite.

5. The method of claim 4 wherein the first solution comprises an iron salt and the second solution comprises a base.

6. The method of claim 5 wherein the first solution is an aqueous solution comprising Fe(II) and a Group VIIA element, and the second solution is an aqueous solution comprising base selected from the group consisting of,ammonia and hydroxides of Group 1A elements.

7. The method of claim 6 wherein the first solution is an aqueous solution comprising at least some dissolved $FeCl_2$ and the second solution is an aqueous solution comprising at least some dissolved NaOH.

8. The method of claim 7 wherein the concentration (molarity) of $FeCl_2$ in the first solution is about the same as the concentration (molarity) of NaOH in the second solution.

9. The method of claim 8 wherein the first stage reagent introduction comprises injecting about equal volumes of the first solution, comprising $FeCl_2$, and the second solution, comprising NaOH.

10. The method of claim 9 wherein the second stage reagent introduction comprises injecting about twice as much volume of the second solution, comprising NaOH, as the first solution, comprising $FeCl_2$.

11. A method for sequestering contaminants in soil comprising the steps of:

performing a first stage reagent introduction. comprising injecting a first solution into soil and injecting a second solution into said soil whereby the first and second solutions combine and, if oxygen is present in said soil, react using said oxygen, and performing a second stage reagent introduction comprising injecting a third solution and fourth solution into said soil whereby the third and fourth solutions combine and react in the soil to form magnetite.

12. The method of claim 11 wherein the first and third solutions comprises an iron salt and the second and fourth solutions comprises a base.

13. The method of claim 12 wherein the first and third solutions are aqueous solutions comprising Fe(II) and a Group VIIA element, and the second and fourth solutions are aqueous solutions comprising base selected from the group consisting of ammonia and hydroxides of Group 1A elements.

14. The method of claim 13 wherein the first and third solutions are aqueous solutions comprising at least some dissolved $FeCl_2$ and the second and fourth solutions are aqueous solutions comprising at least some dissolved NaOH.

15. The method of claim 14 wherein the concentration (molarity) of $FeCl_2$ in the first solution is about the same as the concentration (moiarity) of NaOH in the second solution and also about the same concentration (molarity) of $FeCl_2$ in the third solution, however, only about half the concentration (molarity) of NaOH in the fourth solution.

16. The method of claim 15 wherein about equal volumes of the first and second solutions are injected during the first stage reagent introduction, and about equal volumes of third and fourth solutions are injected during the second stage reagent introduction.

17. A barrier formed by a process comprising the steps of:

introducing into soil containing contaminants, at a first locus, a first solution containing an iron salt, introducing into soil containing contaminants, at a second locus, a second solution containing at least one base compound, whereby the first solution and second solution come into contact with each other in said soil and react to form a magnetite precipitate in situ within said soil.

18. The barrier of claim 17 wherein orientation of the first and second loci is selected from the group consisting of the first and second loci being the same, and the first and second loci being different.

19. The barrier of claim 17 wherein the first solution and the second solution mix in the soil as a result of a mechanism selected from the group consisting of: capillary action within the soil causing movement of the first and second solutions resulting in their mixing, groundwater movement in the soil causing movement of the first and second solutions resulting in their mixing, injection pressure applied when introducing the first and second solutions in to the soil resulting in mixing of the first and second solutions, and any combination of the foregoing.

* * * * *